United States Patent [19]

De La Cruz et al.

[11] Patent Number: 4,906,503

[45] Date of Patent: Mar. 6, 1990

[54] NONWOVEN POLYOLEFIN FILM-FIBRIL BANNER

[75] Inventors: Danilo O. De La Cruz; Harold M. McCabe; Jeffrey P. Shawcross, all of Richmond, Va.

[73] Assignee: E. I. DuPont de Nemours and Company, Wilmington, Del.

[21] Appl. No.: 238,635

[22] Filed: Aug. 30, 1988

[51] Int. Cl.[4] .......................... G09F 17/00; B32B 3/02

[52] U.S. Cl. ...................................... 428/81; 428/122; 428/123; 428/126; 428/137; 428/286; 116/173; 40/603; 40/604

[58] Field of Search ................ 428/81, 122, 123, 126, 428/137, 286; D11/165, 166, 168; 40/603, 604; 116/173

[56] References Cited

U.S. PATENT DOCUMENTS

| | | | |
|---|---|---|---|
| 2,911,746 | 11/1959 | Frey | 40/604 |
| 3,169,899 | 2/1965 | Steuber | 161/72 |
| 3,609,894 | 10/1971 | Miller | 40/604 |
| 3,678,886 | 7/1972 | Tibbet | 116/173 |
| 3,824,725 | 7/1974 | Friedrichsen | 40/604 |

OTHER PUBLICATIONS

Du Pont brochure E-64306 "Tyvek Spunbonded Olefin, a guide to converting," dated Apr. 1984.

*Primary Examiner*—Marion C. McCamish
*Assistant Examiner*—Nizar M. Ibrahim

[57] ABSTRACT

A banner including a bonded nonwoven polyolefin film-fibril sheet having front and back surfaces and having two side edges intersecting top and bottom edges to define four corners. The side edges are generally linear and are folded-over onto the back surface of the sheet and secured with double-faced adhesive tape to form a laminated edgefold with the double-faced adhesive tape sandwiched between two layers of the sheet. The front surface of the sheet has at least a first coating of surface-sealing polymer and means are provided adjacent each corner for attaching cords to the edgefold for hanging the banner.

10 Claims, 3 Drawing Sheets

NONWOVEN POLYOLEFIN FILM-FIBRIL BANNER

BACKGROUND OF THE INVENTION

The present invention relates to indoor and outdoor advertising banners and more particularly relates to banners manufactured from nonwoven polyolefin film-fibril sheets.

Bonded nonwoven sheets of polyolefin film-fibrils of the type disclosed in Steuber, U.S. Pat. No. 3,169,899 are used for banners such as those designed for indoor and outdoor advertising. A commercial polyethylene film-fibril sheet product sold by E. I. du Pont de Nemours and Co. under the trademark TYVEK ® is particularly suitable for such applications. TYVEK ® bonded nonwoven polyethylene film-fibril sheets are lightweight and have outstanding mechanical properties while also having good tolerance to ordinary weather conditions.

Known banners manufactured from bonded nonwoven polyethylene film-fibril sheets, however, have some deficiencies. To make a typical banner having a width substantially greater than its height, the top and bottom of a sheet panel are folded over, a rope is placed inside the fold, and the folded edge is stitched to form a seam. In addition, each end of a typical banner is also seamed. The banner is then hung by suspending it between the two ropes. Since the ropes stretch with time, the banner eventually wrinkles, detracting from its appearance. More importantly, the slack in the ropes and the banner provides an opportunity for wind to catch the banner, whipping it back and forth. This flexing can weaken the fabric, cause the lettering to flake off, and eventually cause the seams to weaken and come apart. Although the film-fibril sheet is strong, the needle holes through the sheet can initiate a tear which can propagate and result in the destruction of the banner.

An alternative suspension method for hanging banners is to use rings or grommets in each corner, and support the banner by ropes attached to the corners. This technique works for small banners which are not greatly affected by wind. For larger, outdoor banners, the grommets typically tear out of the corners since a typical brass grommet does not grip the sheet well and does not grip a sufficient area and thus all of the stress from the suspension system is concentrated on the hole. Ultimately, this leads to destruction or even complete loss of the banner.

An additional failing of current banners is the difficulty of obtaining good printing on the polyolefin surface. Water-based inks do not wet the surface well, and thus may not give sharp printing. Solvent-based inks may cause puckering due to retraction of the oriented film-fibrils, which occurs when contacted by certain solvents. Stick-on vinyl letters used instead of inks can also cause puckering since they often contain solvents or plasticizers as components of the adhesive.

SUMMARY OF THE INVENTION

In accordance with the invention there is provided a banner including a bonded nonwoven polyolefin film-fibril sheet having front and back surfaces and having two side edges intersecting top and bottom edges to define four corners. The side edges are generally linear and are folded over onto the back surface of the sheet and secured with double-faced adhesive tape to form a laminated edgefold with the double-faced adhesive tape sandwiched between two layers of the sheet. The front surface of the sheet has at least a first coating of surface-sealing polymer and means are provided adjacent each corner for attaching cords to the edgefold for hanging the banner.

In accordance with the preferred form of the present invention, the sheet is polyethylene and is generally rectangular with its width being substantially greater than its height.

In accordance with another aspect of the present invention, the coating on the surface of the sheet is a self-crosslinking, surface-sealing acrylic polymer containing an pacifying pigment. Most preferably, a second coating of surface-sealing polymer providing a glossy finish is applied over the first coating.

In accordance with another aspect of the invention, the means for attaching cords to the edgefolds include clamping means for contacting the edgefold on its front and back surfaces over an area of at least about 5 $cm^2$.

In accordance with another preferred form of the invention, the banner further includes an elastic cord attached to the clamping means.

The invention and its various aspects and advantages will become more fully apparent as the following detailed description is read in conjunction with the drawings in which.

DETAILED DESCRIPTION

Figure 1:
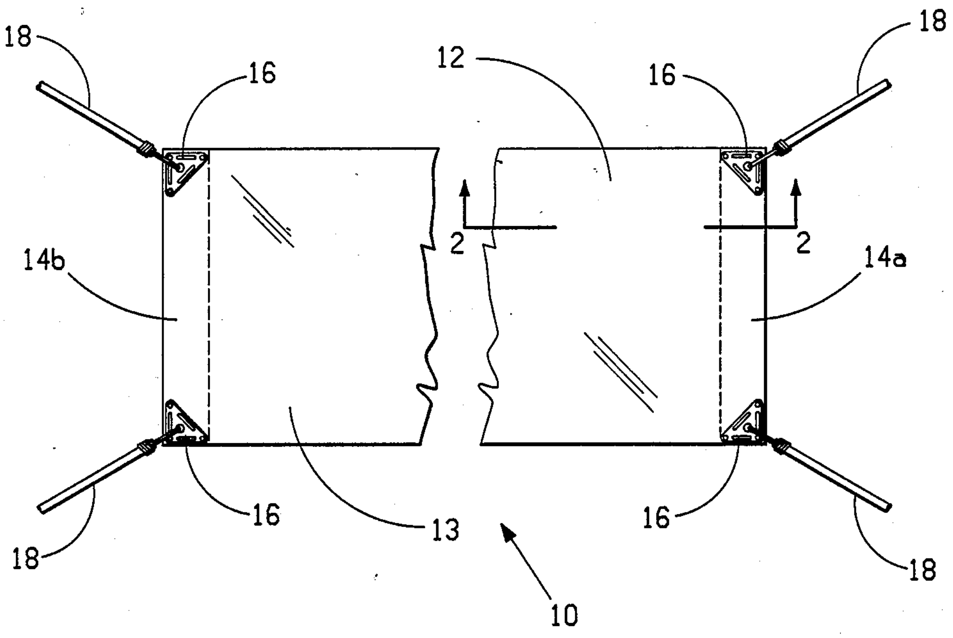
FIG. 1 is a front elevational view of a preferred embodiment of a banner in accordance with the present invention.

Referring now to the drawings in which like reference characters designate like or corresponding parts throughout the views, a preferred embodiment of a banner 10 in accordance with the present invention is shown in FIG. 1. As will be explained in more detail hereinafter, the banner 10 includes a bonded nonwoven polyethylene film-fibril sheet structure 12 having a front printing surface 13 and which is folded over at its side edges onto the back surface to form right and left edgefolds **14*a* and 14*b*, respectively. The edgefolds 14*a* and 14*b* are not visible from the front of the banner and thus are indicated by dotted lines. Preferably, the sheet structure 12** is generally rectangular and has a width substantially greater than its height.

The sheet is provided with clamping means designated by the numeral 16 which are provided adjacent the corners of the sheet 12 and, as will be explained in more detail hereinafter, provide means for attaching cords to the edgefolds **14*a* and 14*b*. Cords 18 are illustrated in FIG. 1** as supporting the banner from its four corners.

Figure 2:
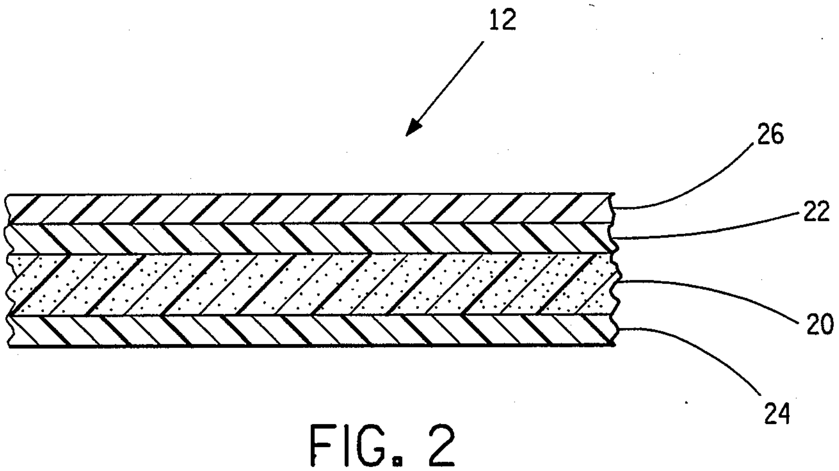
FIG. 2 is a partial, cross-sectional view taken along line 2—2 of FIG. 1 showing the sheet structure employed in a preferred banner in accordance with the present invention.

FIG. 2 is a cross-sectional view of the sheet structure 12 used in the banner 10 with the thicknesses of the various layers being exaggerated for the purposes of illustration. The sheet structure 12 includes a bonded nonwoven polyethylene film-fibril sheet 20 of the type disclosed in Steuber, U.S. Pat. No. 3,169,899, the disclosure of which is incorporated herein by reference. Polyethylene sheets of this type are available commercially under the trademark TYVEK® as sold by E. I. du Pont de Nemours and Company. Suitable commercially-available sheets have a weight of, for example, 3 oz/yd to 4½ oz/yd.

As illustrated, the sheet 20 is covered on the front surface by a front coating 22. The coating 22 is a polymeric coating which makes the surface more receptive to printing inks and also seals the surface so that solvents or plasticizers found in printing inks or on self-adhesive letters do not penetrate and "pucker" the sheet 20. In addition, the coating is preferably opaque to improve the appearance of the sheet structure 12 and to provide UV protection. Preferably, the coating is a self-crosslinking, acrylic polymer coating which is sufficiently flexible to enable the finished banner to be rolled or folded without chipping or cracking. Such coatings can be applied as an aqueous emulsion or dispersion containing pigments and additives such as wetting and dispersing agents. Suitable acrylic polymer emulsions for use in such formulations are commercially available such as the emulsion of a self-crosslinking, acrylic copolymer of ethyl acrylate, methyl methacrylate, and N-(hydroxymethy)acrylamide (45.5% solids) sold under the trademark RHOPLEX TR-407 by Rohm and Haas of Philadelphia, Pa. The coating emulsion can be applied to the sheet using a Meyer Rod coating device, preferably at a level of about 6.8 g/m$^2$ level from a aqueous dispersion having the following composition by weight:

40% RHOPLEX TR-407
58% titanium dioxide powder
1% polydimethylsiloxane wetting agent
1% trisodium phosphate (used as a dispersing agent).

The polymethylsiloxane wetting agent is suitably provided by the product sold as UCARSIL EPS by Union Carbide, Tarrytown, N.Y. Preferably, the same coating emulsion is applied in the same manner to form the same type of opaque coating 24 on the back side of the sheet.

In the preferred form of the invention, a second coating 26 is applied on top of the first coating on the front side of the banner to provide a glossy surface. Acrylic resins free of pigments and which provide a sufficiently flexible coating are useful for this purpose and can be applied as emulsions using a Meyer Rod coating device at a level of about 6.8 g/m$^2$. A composition which has been found to be suitable for this purpose is:

55.5% AC-634 emulsion of a self-crosslinking, acrylic copolymer resin of ethyl acrylate, methyl methacrylate, and methacrylic acid (46.5% solids) (Rohm and Haas)
44% UCAR 6664 acrylic homopolymer resin emulsion (Union Carbide)
0.5% UCARSIL EPS polydimethylsiloxane wetting agent (Union Carbide).

If desired, an emulsion of acrylic latex polymer sold by Franklin International of Columbus, Ohio, under the trademark Covinax 391 may be substituted for the TR-407 in the coatings 22 and 24, or for both AC-634 and UCAR 6664 in the gloss coating 26.

The coatings 22, 24 and 26 can be applied continuously and sequentially to the sheet 20 using a 5 Meyer Rod station coater. Suitable equipment employs a number 10 Meyer Rod at a first station and a number 12 Meyer Rod at a second station for applying the front opaque coating 22. The gloss coating 26 is applied using number 0 rods at stations 3 and 4. Station 5 uses a number 10 rod to apply the back opaque coating 24. Heaters are provided so that the sheets are dried after each station.

Figure 3:
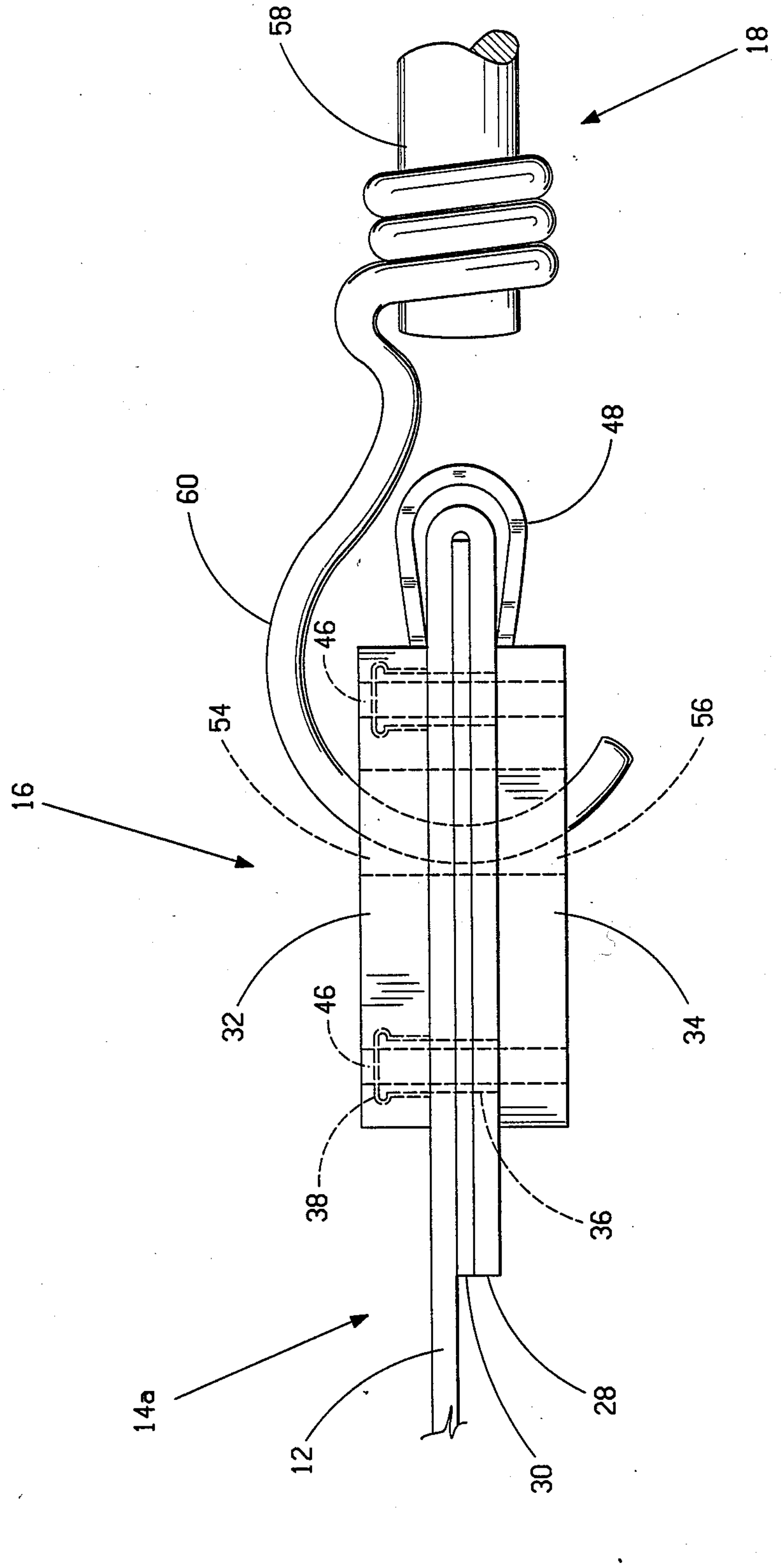
FIG. 3 is a partial edge view of the lower corner of the banner shown in FIG. 1.

Referring now to FIG. 3, a preferred edgefold construction and clamping means for a preferred embodiment of the banner 10 are illustrated on edge. Edgefold 14*a*, illustrated, includes a folded-over portion of the sheet 12 which is designated by the reference character 28. Preferably, the edgefolds 14*a* and 14*b* are wider than the clamping means 16 to be described hereinafter and 2 inches (5.1 cm) is a suitable width. The folded over portion 28 is secured to the back surface of the sheet 12 preferably by means of double-faced tape 30. It is particularly advantageous for the width of the folded over portion 28 to be very close to the width of the double-faced tape used to secure the folded over portion so that the laminated construction is formed with at most, very small unattached areas between the sheet 12 and the folded-over portion 28. A preferred tape for use in constructing a banner 10 in accordance with the invention is sold under the trademark FASTAPE 720P by Avery International-Fasson Industrial Division, Painesville, Ohio. This tape includes a 0.5 mil (0.01 mm) thick polyester carrier with 2.3 mils (0.06 mm) of non-plasticizing, acrylic-based adhesive on each side. A preferred width for such tape is about 2 inches (5.1 cm) and the edge fold is thus easily formed by adhering the tape to the edge of the banner while leaving the release liner in place. Then, the edge is folded and creased using the edge of the tape as a guide and gauge. The release liner is removed and the edgefold is completed by pressing the folded edge and tape firmly in place.

Figure 4:
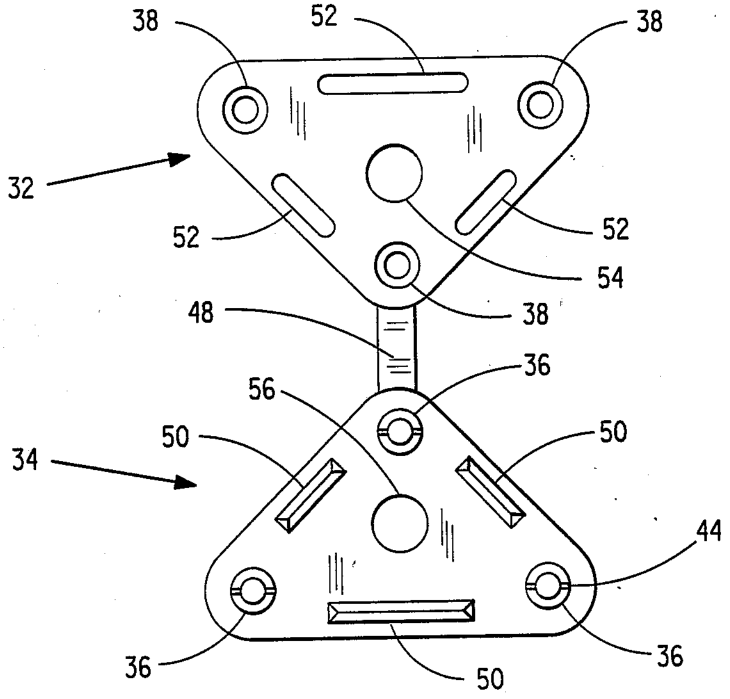
FIG. 4 is a plan view of a preferred clamping means before attachment to the banner.
Figure 5:
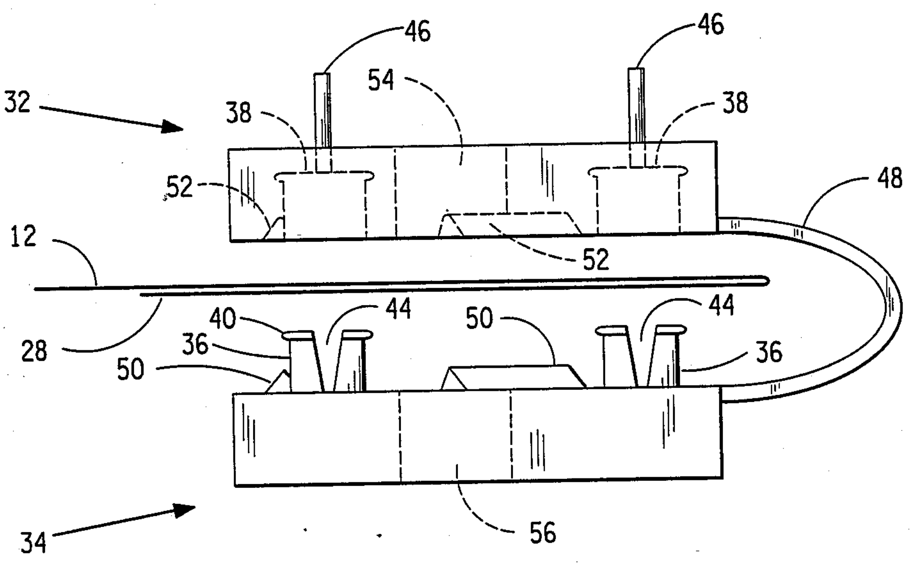
FIG. 5 shows the preferred clamping means of FIGS. 3 and 4 being installed on an edgefold of the banner.

Referring now to FIGS. 3, 4 and 5, a preferred clamping means for attaching to the edgefolds 14*a* and 14*b* adjacent the corners is illustrated. The preferred clamping means provides at least about 5 cm$^2$ of clamping area on the edgefold. In the preferred embodiment, the clamping means includes two isoceles triangular plates having a right angle to conform to the corner of the banner and which clamp the edgefold therebetween. For the purposes of illustration, the plate contacting the front surface will be referred to as the top plate 32 and the plate contacting the edgefold area of the back surface will be referred to as the back plate 34 although it will be understood that their relative positions can be reversed.

The triangular plates 32 and 34 are arranged on either side of the edgefold in alignment with each other with the two legs of the triangle aligned with and spaced-apart from the edges of the corner of the banner. The two plates are secured together for clamping the edgefold by means of 3 projections 36 on the back plate which engage receptacles 38 in the front plate 32. The projections 36 have a generally tubular configuration with a lip 40 at the outermost area as illustrated. A corresponding annular recess 42 is provided in the outer wall of the receptacle 38 so that the lip 40 on the projection 36 is received into and thereby engaged by the annular recess 42 to secure the projection 36 in the receptacle 38.

In order to provide for easier engagement of the projection 36 into the receptacle 38, a V-shaped split 44 is provided on diametrically opposed sides of the projection 36 which allows for relative movement of the semi-circular portions of the projection defined by the split. To further secure the projection 36 in the receptacles 38, a peg 46 is driven into the tubular projections 36 to prevent the relative movement of the semi-circular portions of the projections.

The back plate 34 is further provided with ribs 50 and the front plate 32 is provided with corresponding troughs 52 for receiving the ribs 50 when clamped onto the edge fold of the banner. The ribs and troughs provide more firm engagement with the sheet for more secure holding. As illustrated, the clamping means is provided with bores 54 and 56 which provide an opening through the front plate 32 and back plate 34, respectively, to admit a cord or other means for hanging the banner.

Preferably, the front plate 32 and back plate 34 and associated attachment mechanisms are provided as a unitary, injection-molded fabrication which includes a ribbon hinge 48 which keeps the front plate 32 and back plate 34 with each other until use. A peg 46 for each projection 36 is molded onto the front plate 32 as shown with a tear-away attachment point so that it is in position to be driven into the projection 36. Suitable clamping means 16 of the type depicted are available from KLM Trading, ASA, Sweden, under the trademark HOLE-GUARD with the length of the leg of the triangular plates being about 1¾ inch (4.4 cm). It will be understood that for the use of the clamping means of this type, it is necessary to punch holes through the edgefold so that the projections 36 can extend through the edgefold and to provide a hole which corresponds with the bores 54 and 56.

Referring again to FIGS. 1 and 3, a preferred means for hanging the banner 10 is illustrated. In the preferred embodiment depicted, an elastic cord 18 is employed having a fabric coated elastic portion 58 and a hook 60 The hook 60 engages the clamping means 16 through the bores 54 and 56 so that the banner can be supported by the cord 18. Cords 18 of the type employed are typically referred to as shock or "bungee" cords. As illustrated in FIG. 1, for a banner with a width substantially greater than its height, it is desirable for the cords 18 to exert a force primarily along the width of the banner but the cords at each edgefold should diverge away from each other by at least at a slight angle so that the banner is also maintained in a taut condition along its height.

A banner in accordance with the present invention provides an inexpensive, durable banner which can be assembled in a manner of minutes The construction is greatly simplified since only edgefolds are required at the side edges and no seams along the top or bottom are necessary. Because no stitching is used, the sheet is not weakened by needle holes and further, the clamping means 16 provide a large contact area with the laminated edgefold to distribute the stress at the attachment points. The laminated construction with the adhesive sandwiched between the two layers provides a stronger area to accept the clamping action of the clamping means and also provides for a tight grip. The elastic cord attachment system maintains the banner in a taut, attractive condition and provides "give" needed to prevent damage by the wind. The acrylic polymer coating provides an excellent printing surface which is particularly attractive with the gloss coating and which provides additional strength to the sheet and protects the sheet from UV degradation. Solvent based inks and stick-on letters can be employed if desired.

Although a particular embodiment of the present invention has been described in the foregoing detailed description, it will be understood that the invention is capable of numerous modifications, substitutions and rearrangements without departing from the scope of the invention as set forth in the appended claims.

We claim:

1. A banner comprising a bonded nonwoven polyolefin film-fibril sheet having front and back surfaces and having two side edges intersecting top and bottom edges to define four corners, said side edges being generally linear and being folded-over onto said back surface of said sheet and secured with double-faced adhesive tape to form a laminated edgefold with said double-faced adhesive tape sandwiched between two layers of said sheet, said front surface of said sheet having at least a first coating of surface-sealing acrylic polymer, and means for attaching a cord to said edgefolds adjacent each of said corners for hanging said banner, said means for attaching cords to said edgefold adjacent said corners comprising clamping means for contacting said edgefold on its front and back surfaces and clamping said edgefold therebetween.

2. The banner of claim 1 wherein said sheet comprises a polyethylene film-fibril sheet.

3. The banner of claim 1 wherein said sheet is generally rectangular with its width being substantially greater than its height.

4. The banner of claim 1 wherein the width of said edgefold is approximately equal to the width of said double-faced adhesive tape.

5. The banner of claim 1 wherein said surface sealing acrylic polymer contains an pacifying pigment.

6. The banner of claim 5 further comprising a second coating of surface-sealing acrylic polymer providing a glossy finish applied over said first coating.

7. The banner of claim 1 wherein said clamping means for attaching cords to said edgefold adjacent said corners contacts said edge fold on its front and back surfaces over an area of at least about 5 $cm^2$.

8. The banner of claim 7 wherein said clamping means comprises an opening therethrough to secure said cord to said clamping means.

9. The banner of claim 7 further comprising an elastic cord attached to said clamping means.

10. The banner of claim 1 wherein said double-faced adhesive tape is a double-faced, polyester-based tape with a non-plasticizing, acrylic-based adhesive.

* * * * *